Dec. 26, 1933.  S. G. RUSSELL ET AL  1,941,227
FISHING REEL
Filed April 14, 1932
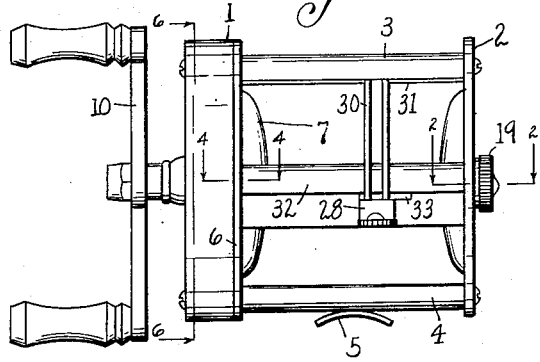
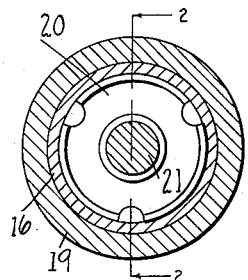
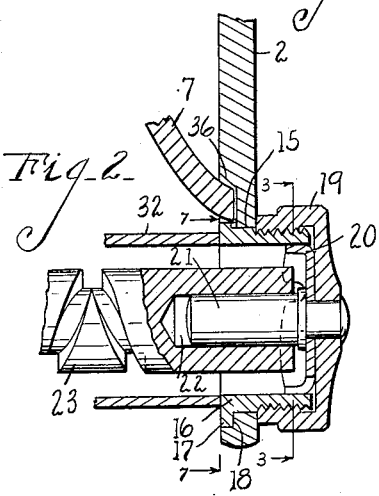
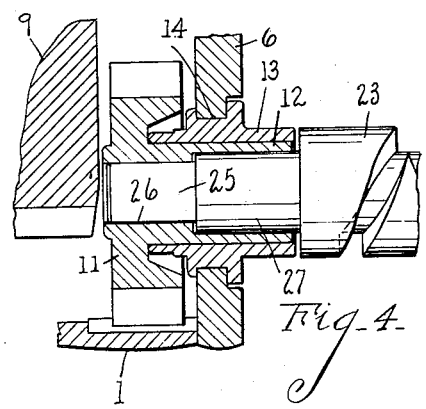
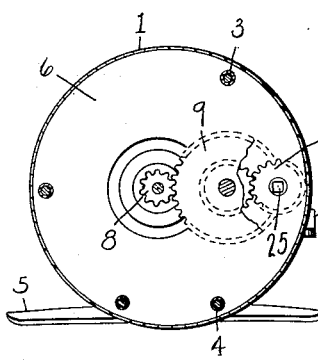
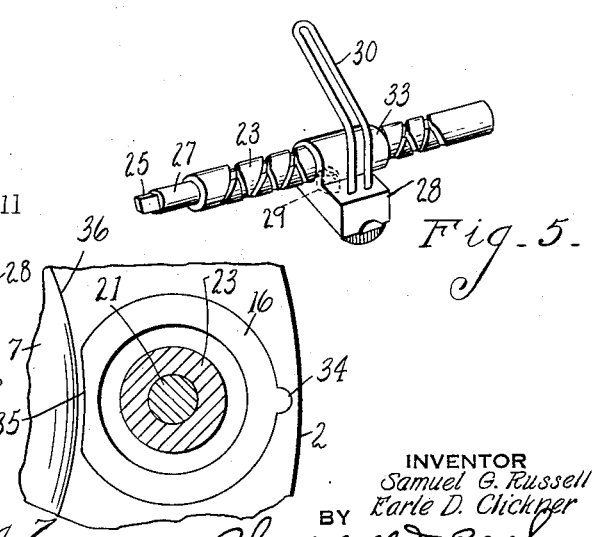
INVENTOR
Samuel G. Russell
Earle D. Clickner
BY
Chappell & Earl
ATTORNEYS Patented Dec. 26, 1933

1,941,227

UNITED STATES PATENT OFFICE 1,941,227

FISHING REEL

Samuel G. Russell and Earle D. Clickner, Kalamazoo, Mich., assignors to Shakespeare Company, Kalamazoo, Mich.

Application April 14, 1932. Serial No. 605,138

10 Claims. (Cl. 242—84.4))

The main objects of this invention are:

First, to provide an improved fishing reel of the level wind type in which the traversing shaft and the coacting line guide carriage may be assembled and disassembled as a unit and without disassembling the frame or the driving means for the traversing shaft.

Second, to provide a fishing reel having these advantages which permits the assembling and disassembling of the traversing shaft without the aid of tools, and at the same time one in which when assembled the shaft is effectively supported and so that it is not subject to undue strains or wear.

Third, to provide a fishing reel of the level wind type in which the traversing shaft may be easily removed and re-assembled, and one which is simple and economical in its parts.

Objects relating to details and economies of the invention will appear from the description to follow. The invention is defined and pointed out in the claims.

A structure which is a preferred embodiment of the invention is illustrated in the accompanying drawing, in which:

Fig. 1 is a front elevation of a fishing reel embodying our invention.

Fig. 2 is an enlarged fragmentary view partially in section on line 2—2 of Figs. 1 and 3.

Fig. 3 is an enlarged section on line 3—3 of Fig. 2.

Fig. 4 is an enlarged fragmentary view partially in section on line 4—4 of Fig. 1.

Fig. 5 is a perspective view of the traversing shaft and line guide carriage disassembled from its coacting parts.

Fig. 6 is a fragmentary sectional view on line 6—6 of Fig. 1, parts being mainly shown conventionally.

Fig. 7 is a fragmentary section on line 7—7 of Fig. 2.

In the embodiment of our invention illustrated, the frame comprises a chambered head designated generally by the numeral 1, a tail plate 2, and connecting pillars as 3 and 4, the bottom pair of pillars 4 having reel seat plate 5 attached thereto. The head comprises an end plate 6.

The spool 7 is suitably journaled in the frame and is provided with a pinion 8 coacting with a train of gears designated generally by the numeral 9 and operatively associated with the crank 10. The traversing shaft gear 11 is also operatively associated with the train of gears 9, this traversing shaft gear 11 having a tubular journal 12 disposed in the bearing 13 secured within the opening 14 in the head plate 6, see Fig. 4.

The tail plate 2 is provided with an opening 15 aligned with the opening 14 and receiving the sleeve or thimble 16 which has a flange 17 at its inner end fitting within the rabbet or recess 18 surrounding the opening 15.

The cap-like spindle or bearing support member 19 is threaded upon this sleeve constituting means, in the embodiment illustrated, for retaining the sleeve in place. The flange of the sleeve is provided with a positioning lug 34 which engages a coacting recess in the end member 2 for properly locating the sleeve, which is cut out at 35 and does not project into the spool flange recess 36. The member 19 carries a friction member 20 fitting within the sleeve and preventing accidental loosening of the member 19.

The member 19 carries a stub shaft or spindle 21 engaging the bore-like bearing 22 in the reversely threaded traversing shaft 23. This traversing shaft has a tang portion 25 fitting the non-circular portion 26 in the gear 11, the bore of the gear constituting a socket to receive the reduced portion 27 of the traversing shaft which enters the tubular bearing or the socket of the traversing shaft gear.

The line guide carriage 28 is mounted upon the shaft and is provided with a pawl 29 indicated by dotted lines in Fig. 5 and coacting with the threads of the shaft to reciprocate the carriage as the shaft is rotated.

The carriage is provided with an elongated line guide eye 30, the upper end of which engages the groove 31 in the pillar 3.

The shaft is preferably provided with a housing or guard 32 which serves to keep the line from the traversing shaft and also prevent dirt from falling thereon as the line passes through the line guide eye and over the housing to and from the spool.

The sleeve is of such diameter that when the support member 19 is removed, the traversing shaft may not only be shifted longitudinally to engage or disengage it from the traversing shaft gear, but the shaft may also be tilted to permit its removal along with the carriage and reassembling without disassembling the frame or the gear 11 from its coacting parts. The disassembling is accomplished by removing member 19, pulling the traversing shaft endwise to disengage it from the driving gear, tilting the shaft downwardly sufficiently to clear the frame at the gear end and then moving the shaft endwise in the opposite direction from the first endwise motion to free the other end of the shaft from the frame.

The sleeve is also preferably of such dimensions as to receive the extension 33 on the carriage so that a relatively wide bearing is provided for the carriage on the traversing shaft.

The parts of the traversing shaft may be assembled or disassembled without the aid of tools and this is of very great advantage in reels as it permits effective cleaning of the traversing shaft which is a very desirable feature for the reason that if the traversing shaft becomes fouled, undue wear results, and also, the reel does not operate with the freedom and ease desired.

We have illustrated and described our improvements in an embodiment which we have found highly satisfactory. We have not attempted to illustrate or describe other embodiments or adaptations which we contemplate as it is believed that this disclosure will enable those skilled in the art to embody or adapt our improvements as may be desired.

Having thus described our invention, what we claim as new and desire to secure by Letters Patent, is:

1. In a fishing reel, the combination with a frame comprising a chambered head including a head plate, a tail plate and connecting pillars, said head and tail plates having aligned openings, of a bearing mounted in said opening in said head plate, a train of driving gears arranged in said head and including a traversing shaft gear having a tubular journal arranged in said bearing, a reversely threaded traversing shaft provided with a gear connecting portion at one end engageable and disengageable with said gear with a longitudinal movement and without removing the gear from its bearing, said shaft having a bore-like bearing at its other end, a sleeve having a flange on its inner end disposed in said opening in said tail plate, a cap-like spindle support threaded upon the outer end of said sleeve and carrying a spindle coacting with said traversing shaft bearing, said support being provided with a friction member engaged within the sleeve whereby when said spindle support is removed, the traversing shaft may be manipulated for removing or assembling with coacting parts without disassembling the frame or said gearing, and a line guide carriage carried by said traversing shaft and removable therewith.

2. In a fishing reel, the combination with a frame comprising a chambered head including a head plate, a tail plate and connecting pillars, said head and tail plates having aligned openings, of a bearing mounted in said opening in said head plate, a train of driving gears arranged in said head and including a traversing shaft gear having a tubular journal arranged in said bearing, a reversely threaded traversing shaft provided with a gear connecting portion at one end engageable and disengageable with said gear with a longitudinal movement and without removing the gear from its bearing, said shaft having a bore-like bearing at its other end, a sleeve disposed in said opening in said tail plate, a spindle support detachably mounted upon the outer end of said sleeve and carrying a spindle coacting with said traversing shaft bearing, whereby when said spindle support is removed, the traversing shaft may be manipulated for removing or assembling with coacting parts without disassembling the frame or said gearing.

3. In a fishing reel, the combination with a frame comprising end members having aligned openings, of a bearing mounted in the opening of one end member, a traversing shaft gear having a journal arranged in said bearing, a traversing shaft provided with a gear connecting portion at one end engageable and disengageable with said gear without removing the gear from its bearing, said shaft having a bearing at its other end, a sleeve disposed in said opening in the other end member, a cap-like spindle support threaded upon the outer end of said sleeve and carrying a spindle coacting with said traversing shaft bearing, whereby when said spindle support is removed, the traversing shaft may be manipulated for removing or assembling with coacting parts without disassembling the frame or said gear, and a line guide carriage carried by said traversing shaft and removable therewith.

4. In a fishing reel, the combination with a frame comprising end members having aligned openings, of a bearing mounted in the opening of one end member, a traversing shaft gear having a journal arranged in said bearing, a traversing shaft provided with a gear connecting portion at one end engageable and disengageable with said gear without removing the gear from its bearing, said shaft having a bearing at its other end, a sleeve disposed in said opening in the other end member, and a spindle support mounted upon one end of said sleeve and carrying a spindle coacting with said traversing shaft bearing, whereby when said spindle support is removed, the traversing shaft may be manipulated for removing or assembling with coacting parts without disassembling the frame or said gear.

5. In a fishing reel, the combination with a frame comprising connected end members, a traversing shaft gear mounted on one of said end members and having a socket with a non-circular part, a traversing shaft provided with a socket engaging portion having a non-circular part and engageable and disengageable with said socket without releasing the gear, a shaft support detachably mounted on the other end member whereby when said shaft support is removed the traversing shaft may be manipulated for removing or assembling the coacting parts without disassembling the frame or said gear, and a line guide carriage operatively associated with said traversing shaft, the size of said last named opening being such that the shaft and carriage are capable of assembly and removal as a unit relative to the end members.

6. In a fishing reel, the combination with a frame comprising end members having aligned openings, of a traversing shaft gear mounted on one end member in alignment with its opening, a traversing shaft provided with a gear engaging portion at one end engageable and disengageable with said gear, a bearing support for the other end of said shaft detachably mounted on the other end member in alignment with said opening therein, whereby when said bearing support is removed, the traversing shaft may be manipulated for removing or assembling with coacting parts without disassembling the frame or said gear, and a line guide carriage operatively associated with said traversing shaft, the size of said last named opening being such that the shaft and carriage are capable of assembly and removal as a unit relative to the end members.

7. In a fishing reel, the combination with a frame comprising connected end members, a traversing shaft gear mounted on one of said end members, a traversing shaft provided with a gear engaging portion engageable and disengageable with said gear without disassembling the gear from its support, a shaft bearing member mounted on the other end member and coacting with said traversing shaft whereby when said bearing member is removed the traversing shaft may be manipulated for removing or assembling the coacting parts without disassembling the frame or said gear, and a line guide carriage operatively associated with said driving shaft, the size of said last named opening being such that the shaft and carriage are capable of assembly and removal as a unit relative to the end members.

8. In a fishing reel, the combination with a frame comprising end members having aligned openings, of a gear mounted on one end member, a traversing shaft engageable with said gear through the opening of said end member on which the gear is mounted, the opening in the other end member being such as to permit longitudinal and tilting movement of the shaft therein in assembling or disassembling the shaft without wholly passing the same through said last named opening, a removable support for said shaft mounted on the last mentioned end member whereby when said shaft support is removed the shaft may be manipulated for assembling or removing without disassembling the frame or said gear, and a line guide carriage coacting with said traversing shaft and removable therewith as a unit.

9. In a fishing reel, the combination with a frame comprising end members having aligned openings, of a gear mounted on one end member, a traversing shaft engageable with said gear through the opening of said end member on which the gear is mounted, the opening in the other end member being such as to permit longitudinal and tilting movement of the shaft therein in assembling or disassembling the shaft without wholly passing the same through said last named opening, and a removable support for said shaft mounted on the last mentioned end member whereby when said shaft support is removed the shaft may be manipulated for assembling or removing without disassembling the frame or said gear.

10. In a fishing reel, the combination with a frame comprising end members, of a gear mounted on one end member, a traversing shaft engageable with said gear by an axial movement of the shaft, the other end member having an opening of such dimensions as to permit longitudinal and tilting movement of the shaft therein in assembling or disassembling the shaft without wholly passing the same through said last named opening, a removable support for said shaft mounted on the last mentioned end member whereby when said shaft support is removed the shaft may be manipulated for assembling or removing without disassembling the frame, and a line guide carriage coacting with said traversing shaft and removable therewith as a unit.

SAMUEL G. RUSSELL.
EARLE D. CLICKNER.